United States Patent [19]
Bret et al.

[11] 4,420,222
[45] Dec. 13, 1983

[54] MIRROR HAVING A VARIABLE FOCAL LENGTH

[75] Inventors: Georges Bret, Verrieres le Buisson; Guy Michelet, Paris, both of France

[73] Assignee: Quantel S.A., Orsay, France

[21] Appl. No.: 253,079

[22] Filed: Apr. 10, 1981

Related U.S. Application Data

[63] Continuation of Ser. No. 896,081, Apr. 13, 1978, abandoned.

[51] Int. Cl.³ .............................................. G02B 5/10
[52] U.S. Cl. .................................................. 350/295
[58] Field of Search ................. 350/295, 360; 372/99

[56] References Cited
U.S. PATENT DOCUMENTS
3,299,368  1/1967  Klebba ..................... 350/295 UX Primary Examiner—F. L. Evans
Attorney, Agent, or Firm—Holman & Stern

[57] ABSTRACT

The mirror comprises a multilayer structure, at least one of the component layers of which is made from a piezoelectric material, and electrodes for applying voltage to the multilayer structure. A free face of the multilayer structure carries the reflecting surface of the mirror. At least one of the outer faces of the mirror comprises at least one zone of curvature which is non-zero in the non-excited state of the multilayer structure.

19 Claims, 10 Drawing Figures

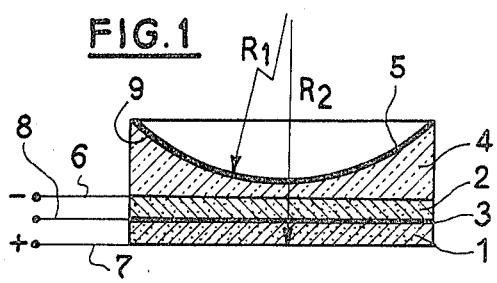
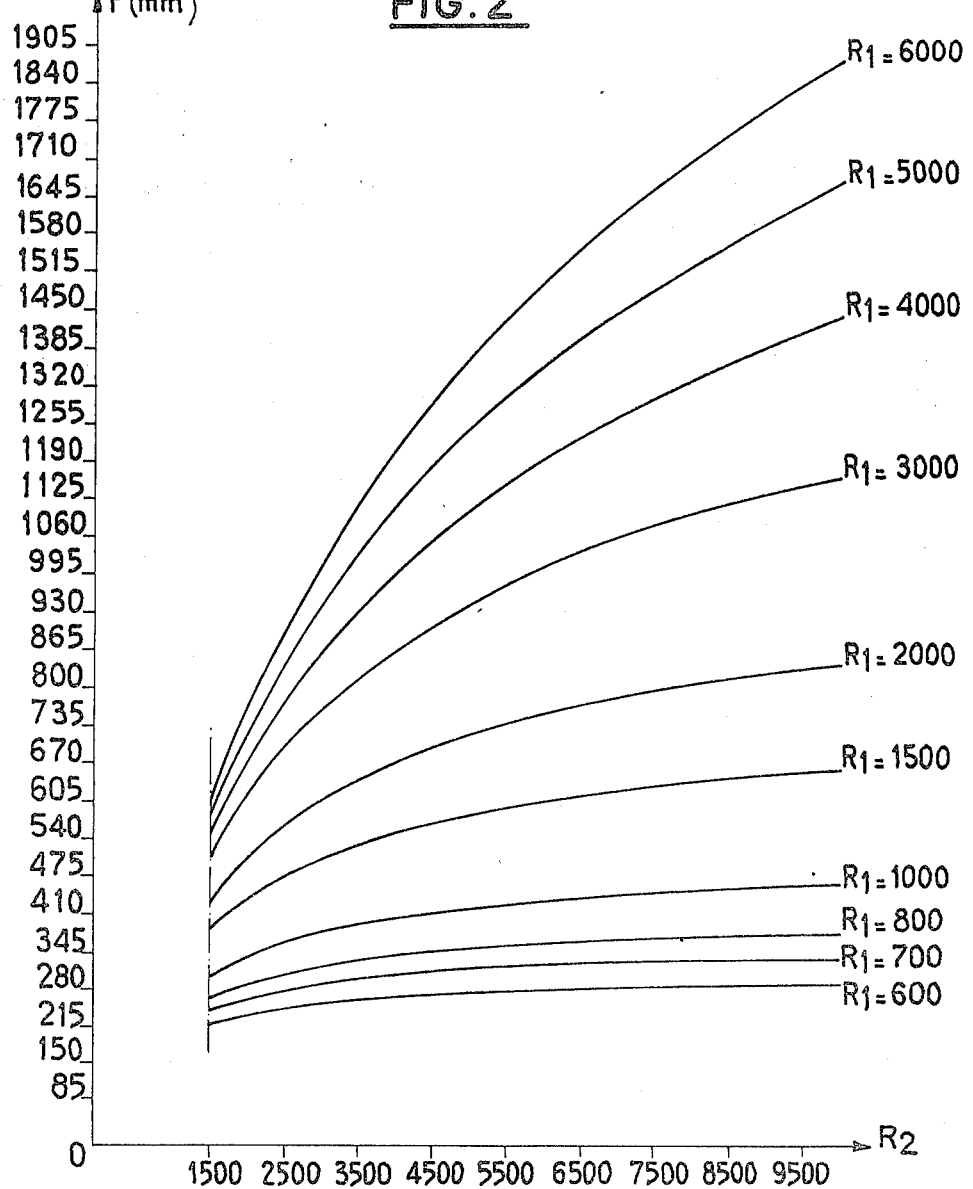

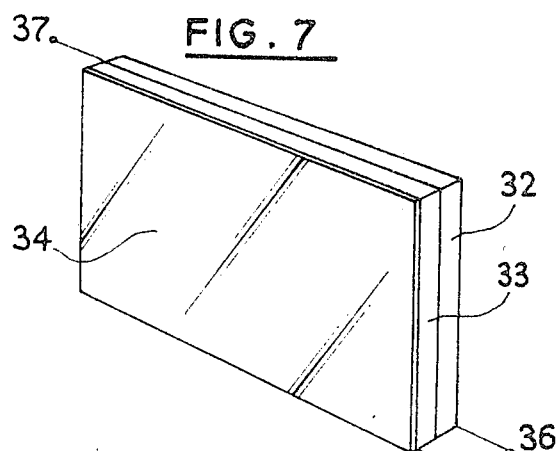
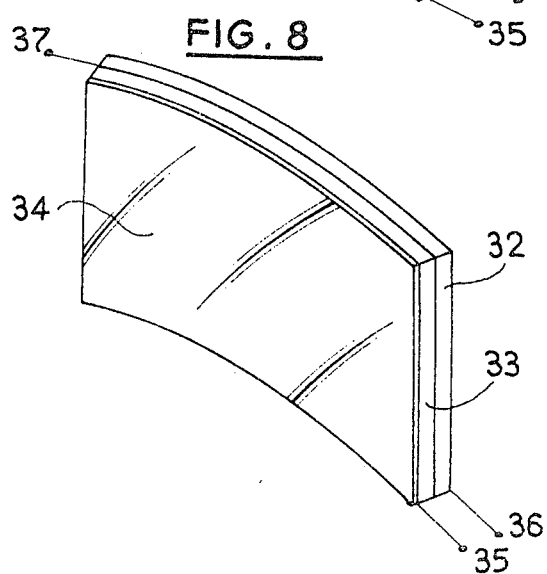
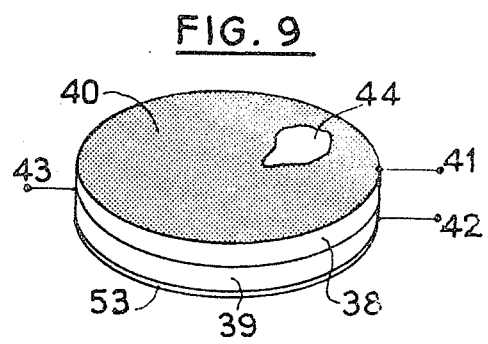
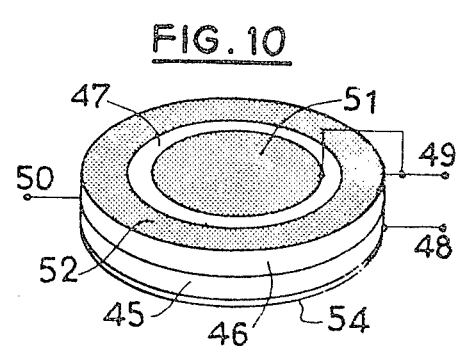

MIRROR HAVING A VARIABLE FOCAL LENGTH

This is a continuation of application Ser. No. 896,081, filed Apr. 13, 1978, now abandoned.

The present invention relates to optical elements and more particularly to mirrors having a variable focal length.

In French Patent Application No. 77 12 799 filed on Apr. 27, 1977 by Guy Michelet and entitled "Improved optical element" there are disclosed mirrors formed by a multilayer structure of piezoelectric material, an outer face of the multilayer structure being rendered reflecting and voltage supplying terminals being respectively fixed to the component layers of the structure.

Said patent application mainly concerns mirrors which are planar in the initial state.

The present invention has for object to provide mirrors having a variable focal length the deformations of which are still further accentuated relative to those of the planar mirrors so as to obtain mirrors which have or do not have an axis of symmetry of any order.

According to the invention there is provided a mirror having a variable focal length and comprising a multilayer structure at least one of the component layers of which is made from a piezoelectric material and electrodes for applying voltage to said multilayer structure, a free face of the multilayer structure carrying the reflecting surface of said mirror, wherein at least one of the free faces of the mirror constructed in this way comprises at least one zone having a curvature other than zero curvature in the non-excited state.

A zone having a curvature which is other than zero curvature is intended to mean any part of a mirror, which may even be very small, which has a certain concavity or convexity, this zone being either on the reflecting surface of the mirror or on the face of the mirror opposed to the reflecting surface.

Further features of the invention will be apparent from the ensuing description with reference to the accompanying drawings which are given solely by way of example and in which:

FIG. 1 is a diagrammatic sectional view of a concave mirror having a variable focal length according to the invention in the initial state of rest thereof;

FIG. 2 is a graph showing the variation in the focal length of concave mirrors such as that shown in FIG. 1 as a function of the radius of curvature R2 of the rear face of the mirror, the radius of curvature R1 of its reflecting surface being taken as a parameter;

FIGS. 7 and 8 are perspective views of a part-cylindrical mirror having a variable focal length, and FIGS. 9 and 10 show respectively two modifications of mirrors having zones of anisotropy.

Figure 3:
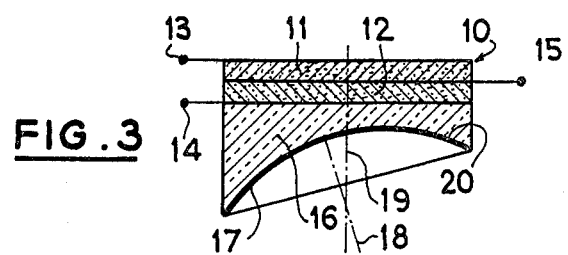
FIG. 3 is a sectional view of another embodiment of a concave mirror in the initial state of rest.

FIG. 1 shows a concave mirror which comprises a multilayer structure formed by two discs 1, 2 of piezoelectric material assembled by an interposed layer 3 which is very thin. Fixed to the disc 2 is a layer 4 of moulded resin whose free surface 5 is concave in the initial state of the mirror, that is to say when the voltage applied to the terminals 6, 7 and 8 of the multilayer structure is zero.

The surface 5 carries a layer 9 of reflecting material.

Although the layer 4 is made from moulded resin, it may also be formed by a strip of glass or any other material in which the concave surface 5 is machined.

A measurement of the regularity or evenness of the surface 5 after removal from the mould has revealed a value in the neighbourhood of $\frac{3}{4}\lambda$, in which $\lambda$ is the wavelength of the light emitted by the source of the interferometer employed for carrying out these measurements.

The mirror shown in FIG. 1 has an initial radius of curvature R1 and its rear face is planar, which corresponds to an infinite radius of curvature R2.

The following table gives by way of examples the voltages which must be applied to three mirrors of piezoelectric ceramic material to obtain radii of curvature R2 of the rear faces of said mirrors. This table may be used jointly with the graph shown in FIG. 2.

TABLE

| Mirror diameter = 50 mm Multilayer structure thickness = 0.5 mm | | | Mirror diameter = 51 mm Multilayer structure thickness = 0.66 mm | | | Mirror diameter = 51 mm Multilayer structure thickness = 1.24 mm | | |
|---|---|---|---|---|---|---|---|---|
| V connected in series (volts) | V connected in parallel (volts) | R2 mm | V connected in series (volts) | V connected in parallel (volts) | R2 mm | V connected in series (volts) | V connected in parallel (volts) | R2 mm |
| 41.6 | 20.8 | $10^4$ | 72.5 | 36.25 | $10^4$ | 256 | 128 | $10^4$ |
| 43.5 | 21.75 | 9 500 | 76 | 38 | 9 500 | 270 | 135 | 9 500 |
| 49 | 24.5 | 8 500 | 85 | 42.5 | 8 500 | 301 | 150.5 | 8 500 |
| 55 | 27.5 | 7 500 | 96 | 48 | 7 500 | 342 | 171 | 7 500 |
| 64 | 32 | 6 500 | 112 | 56 | 6 500 | 394 | 197 | 6 500 |
| 76 | 38 | 5 500 | 132 | 66 | 5 500 | 466 | 233 | 5 500 |
| 92 | 46 | 4 500 | 161 | 80.5 | 4 500 | 569 | 284.5 | 4 500 |
| 119 | 59.5 | 3 500 | 207 | 103.5 | 3 500 | 732 | 366 | 3 500 |
| 167 | 83.5 | 2 500 | 285 | 142.5 | 2 500 | 1 025 | 512.5 | 2 500 |
| 277 | 138.5 | 1 500 | 483 | 241.5 | 1 500 | 1 700 | 850 | 1 500 |

An interferometric measurement of the state of the surface of the mirror to which voltage is applied has shown that the mirror of FIG. 1 also conserves a good regularity or evenness of the order of $\frac{3}{4}\lambda$ in the course of its deformation.

The embodiment shown in FIG. 1 concerns a concave mirror whose rear face is planar in the initial state.

However, it is also possible to render the rear face of the mirror concave or convex in the initial state.

The reflecting surface of the mirror may also be given a convex initial shape the curvature of which will be modified by the application of a voltage to the terminals of the multilayer structure of piezoelectric ceramic material.

FIG. 3 shows a mirror having a variable focal length formed by a multilayer structure 10 the two component layers 11 and 12 of which are made from piezoelectric ceramic material.

Voltage applying terminals 13 and 14 are fixed to the layers 11 and 12 respectively and a common terminal 15 is fixed to the interface between the two layers 11 and 12.

The multilayer structure 10 is fixed to a substrate 16 formed by a strip of glass or a layer of resin.

A part-spherical dome 17, whose axis of symmetry 18 does not coincide with the axis of symmetry 19 of the multilayer structure 10, is formed in the free surface of the substrate. The surface 17 is provided with a layer of reflecting material 20.

The element shown in FIG. 3 consequently constitutes a concave part-spherical mirror when the multilayer structure 10 does not have voltage applied thereto.

Figure 4:
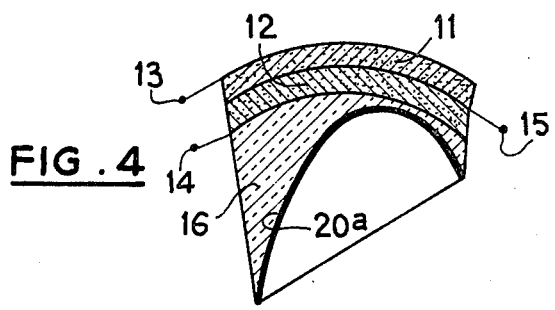
FIG. 4 is a sectional view of the mirror shown in FIG. 3 when a voltage of a first polarity is applied to the piezoelectric multilayer structure which is a part thereof.

When a voltage of a first polarity is applied to the terminals 13-15 of the mirror, the latter assumes the shape shown in FIG. 4.

It can be seen in this Figure that the reflecting surface 20 in the shape of a part-spherical dome is transformed into a surface in the shape of a portion of a paraboloid 20a which has no axis of symmetry of any order.

This transformation is attributed to the variations in the thickness of the substrate 16 owing to the angle made between the axis of symmetry 19 of the multilayer structure and the axis of symmetry of the part-spherical dome 17 when the mirror does not have voltage applied thereto.

Figure 5:
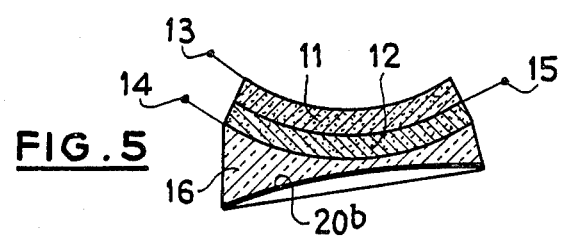
FIG. 5 is a sectional view of the mirror shown in FIG. 3 when a voltage of opposite polarity is applied to the piezoelectric multilayer structure.

When a voltage of opposite polarity is applied to the terminals 13-15 of the mirror, the latter assumes the shape shown in FIG. 5.

Owing to the curvature of the multilayer structure 11,12 in the opposite direction, the reflecting surface of the mirror assumes a more open shape 20b than when the mirror does not have voltage applied thereto.

In the same way as the reflecting surface shown in FIG. 4, the reflecting surface shown in FIG. 5 has no axis of symmetry of any order.

A mirror such as that shown in FIGS. 3-5 is of particular interest when it is desired to correct considerable Coma aberrations.

Figure 6:
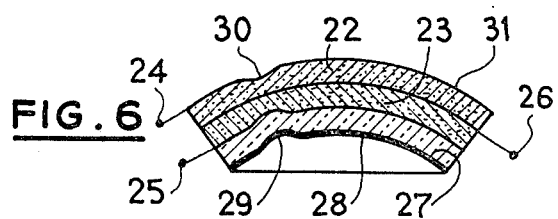
FIG. 6 is a diagrammatic sectional view of a particular embodiment of a mirror having a variable focal length according to the invention.

The mirror shown in FIG. 6 is a concave mirror in the state of rest.

It comprises a multilayer structure formed by two discs 22 and 23 of piezoelectric material, voltage applying terminals 24, 25, 26 being connected to the discs 22 and 23 and to their junction surfaces respectively.

The multilayer structure formed in this way is fixed to a substrate 27 provided with a layer 28 of reflecting material.

As can be seen in FIG. 6, the mirror has at 29 a zone of an imperfection of small area which constitutes an irregularity in the reflecting surface.

In order to correct this imperfection, the thickness of the multilayer structure is reduced locally by recessing the rear face 31 of the disc 22 in front of the zone 29 so that, when the multilayer structure is excited, the imperfection disappears.

Such a local reduction, and sometimes a reduction at a point at 30, in the section of the piezoelectric material produces a localized reduction in the strength of the mirror. This may be obtained by scraping the surface of the face of the mirror opposed to its reflecting surface. The correcting operations by scraping can be advantageously carried out while the mirror has voltage applied thereto and is illuminated by a source of light. Thus, the disappearance of the defect in the reflection produced by the zone of irregularity 29 can be observed in the course of the operations for correcting this defect.

As opposed to that which has been mentioned with reference to FIG. 6, it is sometimes necessary to have a mirror which has a zone of anisotropy whereby it is possible to modify the path of certain rays of a light beam impinging on the mirror.

The invention enables this result to be obtained by causing the formation of a zone of imperfection, such as the zone 29 of FIG. 6, on the surface of a mirror which was initially without a defect by a local modification of the thickness of the multilayer structure such as shown at 30 in FIG. 6.

This permits obtaining, when the multilayer structure is excited, a singular point such as 29. However, in the present case, this singular point is invisible when the multilayer structure is at rest and only appears when a voltage is applied thereto.

If a plurality of singular points is desired to be obtained on the reflecting surface of the mirror, it is sufficient to carry out a plurality of operations for modifying the thickness of the multilayered structure localized in front of the positions of the desired singular points.

The presence of the singular points has a direct repercussion on the wave surface of the beam reflected by the mirror.

Supposing for example that a part-spherical mirror similar to that shown in FIG. 1 operates at a non-zero incidence and gives of an object located at infinite distance, an image having Coma aberrations of a low order and of a high order.

To overcome the Coma aberrations of a low order the mirror of FIG. 1 is replaced by a mirror such as that of FIG. 3.

To overcome the Coma aberrations of a high order, it is sufficient to produce on the reflecting surface of the mirror of FIG. 3 singular points by a scraping of the rear face at points corresponding to the singular points. These singular points produce on the wave surface of the beam reflected by the mirror the desired correcting deformations.

The mirror shown in FIG. 7 is formed by a multilayer structure of piezoelectric material the component layers 32 and 33 of which are rectangular plates of piezoelectric material.

The height of the plates is less than their length in a ratio at the most equal to two thirds.

A layer 34 of reflecting materials is fixed on the component layer 33 of the multilayer structure.

Voltage applying terminals 35, 36 and 37 are connected to the outer surfaces of the plates 32 and 33 and to their junction surface respectively, these surfaces being provided in the known manner, in the same way as all the piezoelectric component layers described hereinbefore, with a layer of an electrically conductive material (not shown).

The mirror of FIG. 7 is shown in the state of rest. This mirror is shown in the excited state of FIG. 8.

It can be seen that owing to the difference between the width and height of the mirror, the latter assumes a substantially part-cylindrical shape in the excited state.

In the embodiment shown in FIG. 8, the mirror assumes a concave shape but by inverting the polarity of the voltage applied to its terminals, it can assume a convex shape which is also part-cylindrical. This result is due to the preferential deformation of the mirror in the larger dimension of the latter under the effect of the piezoelectric forces produced in the multilayer structure.

FIG. 6 showed a mirror whose reflecting surface has a zone of anisotropy 29 obtained by scraping the rear face 31 of the mirror.

FIG. 9 shows a mirror having a zone of anisotropy obtained in a different way.

This mirror is formed by a multilayer structure of piezoelectric material formed by two discs 38, 39 the faces of which are provided with a layer of conductive material. Only the layer 40 covering the disc 38 can be seen in FIG. 9.

The mirror further comprises terminals 41, 42 and 43 for applying voltage and connected respectively to the outer surfaces of the discs 38 and 39 and to their junction surface. It can be seen in FIG. 9 that the conductive layer 40 is uniformly applied to the outer surface of the disc 38 except for a zone 44 which has been left bare.

This zone 44 results in a non-uniform distribution of the electric field in the layer 40 when voltage is applied to the multilayer structure and this causes a region of anisotropy to appear on the reflecting surface 53 of the mirror carried by the disc 39.

In the embodiment just described, the bare zone 44 is located on the free outer surface of the disc 38, but it is also possible to provide such a zone in the junction layer between the discs.

FIG. 10 shows a mirror having a variable focal length formed by a multilayer structure constituted by two piezoelectric discs 45 and 46.

In this mirror, the zone of anisotropy is defined by an annular region 47 which is devoid of a conductive layer whereas the remainder of the surface of the disc 46 is provided with a conductive layer.

The mirror has voltage applying terminals 48, 49 and 50 similar to those of the mirror shown in FIG. 9.

However, the terminal 49 of the disc 46 is connected to the two conductive regions 51 and 52 defined by the annular region 47.

In the non excited state of the mirrors shown in FIGS. 9 and 10, the reflecting surfaces 53 and 54 thereof may be planar or curved.

The layers of electrically conductive material are generally formed by gliding or silvering. They may also be formed by conductive resins.

The zones of antisotropy may be obtained by depositing on one of the faces of a piezoelectric component layer of the multilayer structure a layer of an electrically conductive material of variable conductivity.

In the embodiments shown in FIGS. 1 and 3, the mirrors comprise reflecting surfaces having a curvature. But it is also possible to construct mirrors whose faces opposed to the reflecting surfaces would be nonplanar, concave or convex.

These concave or convex surfaces may have an axis of symmetry which coincides or does not coincide with that of the multilayer structure of piezoelectric material which is part of the construction of the mirror.

The disclosure of aforementioned French patent application No. 77 12 799 is inserted in this disclosure by reference.

French patent application No. 77 12 799 discloses merely by way of example the following list of piezoelectric materials suitable for the optical elements of the invention.

For the mirrors:
  Barium titanates
  Calcium titanates
  Strontium titanates
  Tantalum titanates
For the lenses:
  Quartz
  Seignette salt
  Potassium monophosphates
  Rubidium monophosphates
  Ceasium monophosphates French patent application No. 77 12 799 also cites an article by J. H. McElroy, P. E. Thompson, H. E. Walker, E. H. Hohnson, D. J. Radecki and R. S. Reynolds, entitled "Laser tuners using circular piezoelectric benders" in the American review Applied Optics, volume 14, No. 6, June 1975, which gives further information or the construction and use of a multilayer structure as a bender.

Having now described our invention, what we claim as new and desire to secure by Letters Patent is:

1. A mirror having a reflecting surface, the entire area of which is intended to selectively focus an image reflected thereby in a continuously variable focal plane, the variation of which is obtained by a deformation of the structure of that mirror, the latter comprising a multilayer structure at least one component of the component layers of which is made from piezoelectric material the thickness of the entire multilayer structure being in the order of magnitude of one millimeter, and electrodes combined with said multilayer structure for applying voltage to said multilayer structure, said multilayer structure having an outer face, said reflecting surface being provided on said outer face, the mirror constructed in this way having outer faces at least one of which outer faces comprises at least one zone having a given curvature in the non-excited state of said multilayer structure, whereby said electrodes are connected to terminals adapted to be supplied with a selectively variable voltage the variation of which causes said image to be selectively focused in said focal plane.

2. A mirror as claimed in claim 1, wherein said zone having a given curvature constitutes the whole of said reflecting surface of the mirror.

3. A mirror as claimed in claim 2, wherein the mirror is a concave mirror.

4. A mirror as claimed in claim 1, comprising a substrate having a first outer face on which said multilayer structure is fixed, said reflecting surface, being formed by a layer of reflecting material deposited on a second outer face of said substrate which comprises said zone having a given curvature.

5. A mirror as claimed in claim 1, wherein said reflecting surface is formed by a layer of reflecting material deposited as an outer face of said multilayer structure which comprises said zone having a given curvature.

6. A mirror as claimed in claim 2, 3, 4 or 5, wherein the reflecting surface of the mirror has an axis of symmetry which coincides with an axis of symmetry of said multilayer structure.

7. A mirror as claimed in claim 2, 3, 4 or 5, wherein the reflecting surface of the mirror has an axis of symmetry which intersects an axis of symmetry of said multilayer structure.

8. A mirror as claimed in claim 1, wherein said zone having a given curvature is formed on a face of the mirror opposed to the reflecting surface thereof.

9. A mirror as claimed in claim 1, wherein said zone having a given curvature constitutes the whole of a face of the mirror opposed to the reflecting surface of the mirror.

10. A mirror as claimed in claim 1, wherein said zone having a given curvature constitutes the whole of a face of the mirror opposed to the reflecting surface of the mirror and has an axis of symmetry which coincides with an axis of symmetry of said multilayer structure.

11. A mirror as claimed in claim 1, wherein said zone having a given curvature is defined by a local reduction in the section of the material of one of the component layers of said multilayer structure formed in a face of the mirror opposed to the reflecting surface of the mirror and facing an irregularity of said reflecting surface which it is desired to correct.

12. A mirror as claimed in claim 1, wherein said zone having a given curvature is defined by a local reduction in the section of the material of one of the component layers of said multilayer structure formed in a face of the mirror opposed to the reflecting surface of the mirror and facing a zone of said reflecting surface in which an irregularity is desired.

13. A mirror as claimed in claim 2, 3 or 5, comprising in at least one zone of a face of the mirror opposed to the reflecting surface a local reduction in the section of the material of the corresponding component layer of said multilayer structure in front of an irregularity of said reflecting surface which it is desired to correct.

14. A mirror as claimed in claim 2, 3 or 5, comprising in at least one zone of a face of the mirror opposed to the reflecting surface a local reduction in the section of the material of the corresponding component layer of said multilayer structure in front of a zone of said reflecting surface in which an irregularity is desired.

15. A mirror as claimed in claim 1, wherein a piezoelectric component layer of said multilayer structure has at least one face provided with an electrically conductive layer and said reflecting surface has at least one zone of anisotropy defined by at least one zone of said face of the piezoelectric component layer of said multilayer structure which is devoid of said electrically conductive layer which covers the remainder of said face.

16. A mirror as claimed in claim 15, wherein said zone is provided on a face of said multilayer structure opposed to the reflecting surface of the mirror.

17. A mirror as claimed in claim 15 or 16, wherein said zone is formed by at least one annular region of said face separating regions of said face which are provided with said electrically conductive layer, the corresponding voltage applying electrode being connected to said regions provided with the electrically conductive layer.

18. A mirror as claimed in claim 1, 2, 3, 4 or 5, wherein at least one face of said multilayer structure carries an electrically conductive layer which has a variable electrical conductivity.

19. A mirror comprising:
a reflecting surface having a prescribed area;
means for selectively focusing an image reflected from the entire prescribed are in a focal plane having a focal length which is variable over a continuous range of focal lengths, said means comprising:
a multilayer structure for said mirror wherein at least one layer of the structure is made of piezoelectric material, said multilayer structure having first and second outer faces, said first outer face corresponding to said reflecting surface, said multilayer structure being sufficiently thin to permit it to be curved over a continuous curvature range from a non-excited state in response to application of a variable voltage to said multilayer structure, wherein at least one of said outer faces includes at least one zone having a finite curvature in said non-excited; and
electrode means connected to said multilayer structure for applying a selectively variable voltage to said multilayer structure to vary the curvature of said reflecting surface as a function of the applied voltage.

* * * * *